United States Patent
(12)
Wang et al.

(10) Patent No.: US 12,716,736 B2
(45) Date of Patent: Aug. 25, 2026

(54) LOCALIZATION WITH POINT TO LINE MATCHING

(71) Applicants: Ford Global Technologies, LLC, Dearborn, MI (US); Australian National University, Canberra (AU)

(72) Inventors: Shan Wang, Lawson (AU); Yanhao Zhang, Aranda (AU); Akhil Perincherry, Dearborn, MI (US); Ankit Girish Vora, Northville, MI (US); Hongdong Li, Lyneham (AU)

(73) Assignees: Ford Global Technologies, LLC, Dearborn, MI (US); Australian National University, Canberra (AU)

( * ) Notice: Subject to any disclaimer, the term of this patent is extended or adjusted under 35 U.S.C. 154(b) by 330 days.

(21) Appl. No.: 18/508,649

(22) Filed: Nov. 14, 2023

(65) Prior Publication Data

US 2025/0155254 A1 May 15, 2025

(51) Int. Cl.

*G01C 21/36* (2006.01)
*G01C 21/34* (2006.01)
(Continued)

(52) U.S. Cl.

CPC ..... *G01C 21/3602* (2013.01); *G01C 21/3407* (2013.01); *G06T 7/50* (2017.01);
(Continued)

(58) Field of Classification Search

CPC ............ G01C 21/3602; G01C 21/3407; G01C 21/005; G01C 21/3807; G01C 21/3833;
(Continued)

(56) References Cited

U.S. PATENT DOCUMENTS 8,953,044 B2 2/2015 Wu et al.
9,465,129 B1 10/2016 Olsson et al.
(Continued)

FOREIGN PATENT DOCUMENTS

CN 115330851 A * 11/2022 ............. G06V 10/82
WO WO-2018071979 A1 * 4/2018 ........... G03B 15/006

OTHER PUBLICATIONS

Wang, Shan, et al. "Satellite Image Based Cross-view Localization for Autonomous Vehicle". ICRA 2023, Jul. 27, 2022. https://doi.org/10.48550/arXiv.2207.13506. (Year: 2022).*
(Continued)

*Primary Examiner* — Andrew M Moyer
*Assistant Examiner* — Mario Anthony Rodin
(74) *Attorney, Agent, or Firm* — Frank A. MacKenzie; Brooks Kushman P.C.

(57) ABSTRACT

A computer that includes a processor and a memory, the memory including instructions executable by the processor to determine top key points from one of an aerial feature map or one or more ground feature maps and project the top key points as corresponding lines on the other of the aerial feature map or the one or more ground feature maps. The memory includes instructions to determine a depth estimate for the top key points on the corresponding lines. A high-definition estimated three degree-of-freedom pose of a ground view camera is determined in global coordinates by iteratively determining geometric correspondence between the top key points and the corresponding lines until a global loss function is less than a user determined threshold.

20 Claims, 8 Drawing Sheets

(51) Int. Cl.
*G06T 7/50* (2017.01)
*G06T 7/80* (2017.01)

(52) U.S. Cl.
CPC ...... *G06T 7/80* (2017.01); *G06T 2207/10032* (2013.01); *G06T 2207/20084* (2013.01); *G06T 2207/30244* (2013.01); *G06T 2207/30252* (2013.01)

(58) Field of Classification Search
CPC ... G06T 7/50; G06T 7/80; G06T 2207/10032; G06T 2207/20084; G06T 2207/30244; G06T 2207/30252; G06T 7/73
See application file for complete search history.

(56) References Cited

U.S. PATENT DOCUMENTS

| | | | | |
|---|---|---|---|---|
| 10,515,458 | B1 | 12/2019 | Yakimenko et al. | |
| 11,107,235 | B1 | 8/2021 | Connell et al. | |
| 11,334,756 | B2 | 5/2022 | Neser | |
| 11,501,104 | B2 | 11/2022 | Ung et al. | |
| 2018/0239032 | A1 | 8/2018 | Thiel et al. | |
| 2019/0339705 | A1 | 11/2019 | Demir | |
| 2021/0104065 | A1 | 4/2021 | Hasberg et al. | |
| 2021/0366150 | A1 | 11/2021 | Mittal et al. | |
| 2022/0196432 | A1 | 6/2022 | Buda et al. | |
| 2022/0214187 | A1 | 7/2022 | Liu et al. | |
| 2022/0230353 | A1 | 7/2022 | Lee et al. | |
| 2022/0237414 | A1 | 7/2022 | Zhang et al. | |
| 2022/0398775 | A1 | 12/2022 | Streem et al. | |
| 2024/0328816 | A1 * | 10/2024 | Wang | G01C 21/30 |

OTHER PUBLICATIONS

Yang, L., et al., "SANet: Scene Agnostic Network for Camera Localization," Computer Vision Foundation, 2019, 10 pages.
Von Stumberg, L., et al., "LM-Reloc: Levenberg-Marquardt Based Direct Visual Relocalization," arXiv:2010.06323v1 [cs.CV] Oct. 13, 2020, 12 pages.
Sarlin. P. et al., "Back to the Feature: Learning Robust Camera Localization from Pixels to Pose," arXiv:2103.09213v2 [cs. CV] Apr. 7, 2021, 19 pages.
Shi, Y. et al., "Beyond Cross-view Image Retrieval: Highly Accurate Vehicle Localization Using Satellite Image," Computer Vision Foundation, 2022, 11 pages.
Toker, A. et al., "Coming Down to Earth: Satellite-to-Street View Synthesis for Geo-Localization," Computer Vision Foundation, 2021, 10 pages.
Liu, L. et al., "Lending Orientation to Neural Networks for Cross-view Geo-localization," Computer Vision Foundation, 2019, 10 pages.
Hu, S. et al., "CVM-Net—Cross-Viewing Matching Network for Image-Based Ground-to-Aerial Geo-Localization," ReserchGate, Jun. 2018, 11 pages.
Shi, Y, et al., "Spatial-Aware Feature Aggregation for Cross-View Image based Geo-Localization," Australian National University, 2019, 11 pages.
Shi, Y, et al., "Optimal Feature Transport for Cross-View Image Geo-Localization," The Thirty-Fourth AAAI Conference on Artificial Intelligence, 20208 pages.
Legentil, C. et al. INertial Lidar Localisationand MApping, IEEE, 2019 International Conference, 3 pages.
Maddern, W. et al., "Leveraging Experience for Large-Scale LIDAR Localisation in Changing Cities," IEEE, 2015 International Conference, 8 pages.
Pascoe, G, et al., "Robust Direct Visual Localisation using Normalised Information Distance," Mobile Robotics Group, 2015, 13 pages.
Pascoe, G, et al., "Direct Visual Localisation and Calibration for Road Vehicles in Changing City Environments," IEEE, 2015 International Conference, 3 pages.
Mcmanus et al., "Shady dealings_ Robust, long-term visual Localisation using Illumination Invariance," 2014 IEEE International Confernece, 3 pages.
"Maps Static API," Google Maps Developers, 2022, 2 pages.
Agarwal, S. et al., "Ford Multi-AV Seasonal Dataset," arXiv:2003.07969v1 [cs.RO] Mar. 17, 2020, 7 pages.
Geiger, A. et al., "Vision meets Robotics: The KITTI Dataset," International Journal of Robotics Research, 2013, 6 pages.
Fu, M., et al., "LiDAR-based vehicle localization on the satellite image via a neural network," Robotics and Autonomous Systems, 2020, 11 pages.
Wang, S., et al., "Satellite Image Based Cross-view Localization for Autonomous Vehicle," arXiv:2207.13506v1 [cs.CV] Jul. 27, 2022, 8 pages.
Final Office Action dated Sep. 25, 2025 re U.S. Appl. No. 18/191,165, filed Mar. 28, 2023.

* cited by examiner

LOCALIZATION WITH POINT TO LINE MATCHING

BACKGROUND

Computers can be used to operate systems including vehicles, robots, drones, and/or object tracking systems. Data including images can be acquired by sensors and processed using a computer to determine a location of a system with respect to objects in an environment around the system. The computer may use the location to determine trajectories for moving a system in the environment. The computer may then determine control data to transmit to system components to control system components to move the components according to the determined trajectories.

DETAILED DESCRIPTION

Figure 1:
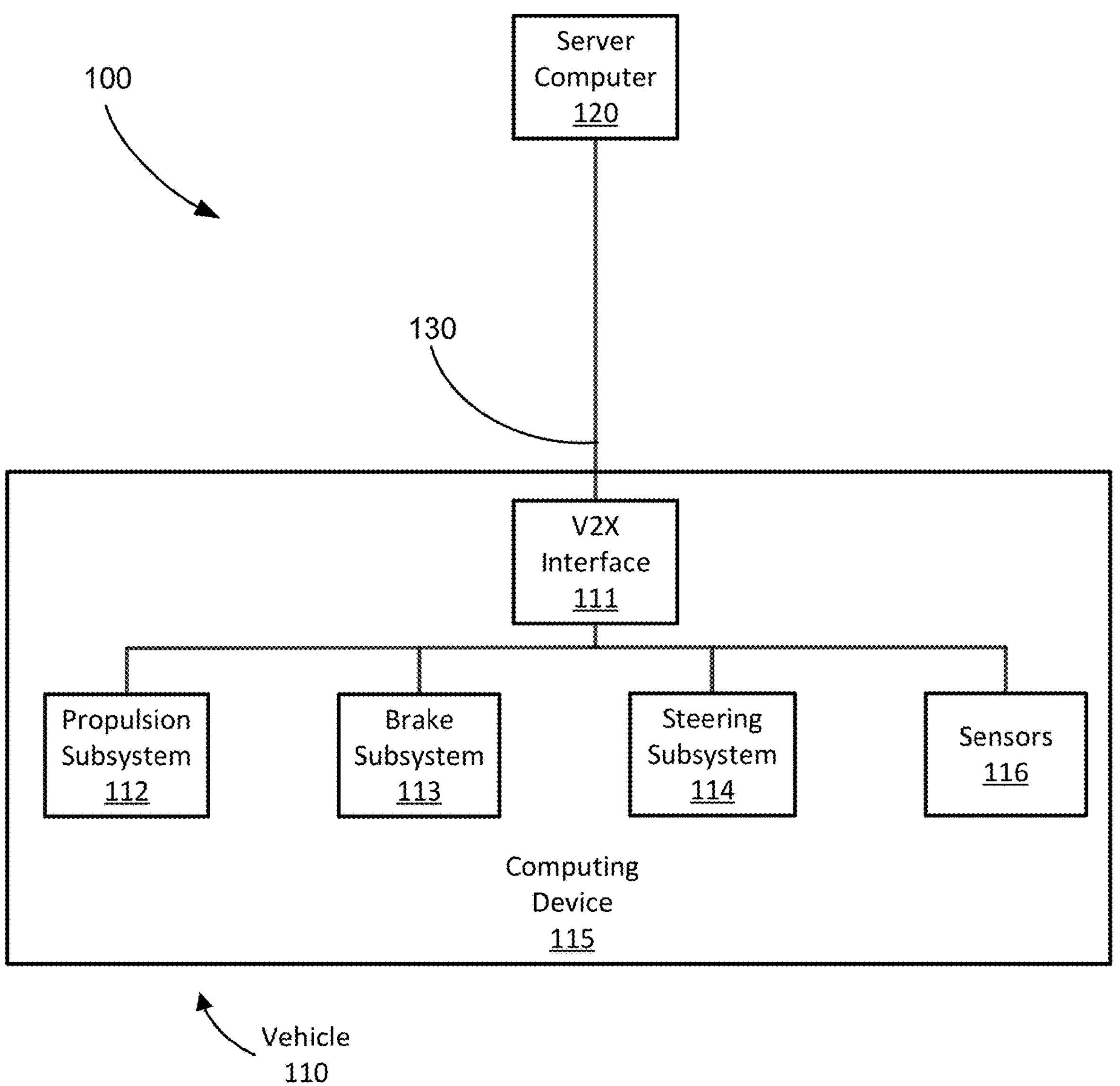
FIG. 1 is a block diagram of an example vehicle sensing system.

Systems including vehicles, robots, drones, etc., can be operated by acquiring sensor data regarding an environment around the system and processing the sensor data to determine a path upon which to operate the system or portions of the system. The sensor data can be processed to determine locations of objects in an environment. The objects can include roadways, buildings, conveyors, vehicles, manufactured parts, etc. Sensor data can be processed to determine a pose for the system, where a "pose" specifies a location and an orientation of an object such as a system and/or components thereof. A system pose can be determined based on a full six degree-of-freedom (DoF) pose which includes x, y, and z location coordinates, and roll, pitch, and yaw rotational coordinates with respect to the x, y, and z axes, respectively. The six DoF pose can be determined with respect to a global coordinate system such as a Cartesian coordinate system in which points can be specified according to latitude, longitude, and altitude or some other x, y, and z axes.

A vehicle is used herein as a non-limiting example of a system. Vehicles can be located with respect to an environment around the vehicle using a simpler three DoF pose that assumes that the vehicle is supported on a planar surface such as a roadway which fixes the z, pitch, and roll coordinates of the vehicle to match the roadway. The vehicle pose can be described by x and y position coordinates and a yaw rotational coordinate to provide a three DoF pose that defines the vehicle location and orientation with respect to a supporting surface.

Vehicle sensors can provide data that can be used to determine a vehicle pose and that in turn can be used to locate a vehicle with respect to an aerial image that includes location data in global coordinates. For example, vehicle sensors may provide data for determining location and/or pose based on a satellite-based global positioning system (GPS) and/or an accelerometer-based inertial measurement unit (IMU). The location data included in the aerial image can be used to determine a location in global coordinates of any pixel address location in the aerial image, for example. An aerial image can be obtained by satellites, airplanes, drones, or other aerial platforms. Satellite data will be used herein as a non-limiting example of aerial image data. For example, satellite images can be obtained by downloading GOOGLE™ maps or the like from the Internet.

Determining a pose of an object such as a vehicle with respect to satellite image data using global coordinate data included in or with the satellite images can typically provide pose data within +/−3 meters location and +/−3 degrees of orientation resolution. Operating a vehicle may rely on pose data that includes one meter or less resolution in location and one degree or less resolution in orientation. For example, +/−3 meter location data may not be sufficient to determine the location of a vehicle with respect to a traffic lane on a roadway. Techniques for satellite image guided geo-localization as discussed herein can determine vehicle pose within a specified resolution, typically within one meter or less resolution in location and one degree or less resolution in orientation, e.g., a resolution sufficient to operate a vehicle on a roadway. Vehicle pose data determined within a specified resolution, i.e., that exceeds one or more specified resolution thresholds, e.g., one meter or less resolution in location and one degree or less resolution in orientation in an exemplary implementation, is referred to herein as high-definition pose data.

Techniques described herein employ satellite image guided geo-localization to enhance determination of a high-definition pose for a vehicle. Satellite image guided geo-localization uses images acquired by sensors included in a vehicle to determine a high-definition pose with respect to satellite images without requiring predetermined high-definition (HD) maps. The vehicle sensor images, and the satellite images are input to one or more neural networks which extract features from the images along with confidence and/or attention maps. In some examples the one or more neural networks can be the same neural network. 3D feature points from the vehicle images are matched to 3D feature points from the satellite images to determine a high-definition pose for the vehicle with respect to the satellite image. The high-definition pose for the vehicle can be used to operate the vehicle by determining a vehicle path based on the high-definition pose.

Disclosed herein is a system including a computer that includes a processor and a memory. The memory includes instructions executable by the processor to determine top key points from one of an aerial feature map or one or more ground feature maps. The top key points are projected as corresponding lines on the other of the aerial feature map or the one or more ground feature maps. The processor determines a depth estimate for the top key points on the corresponding lines and determines a high-definition estimated three degree-of-freedom pose of a ground view camera in global coordinates by iteratively determining geometric correspondence between the top key points and the corresponding lines until a global loss function is less than a user determined threshold.

The global loss function can be determined by summing 1) a pose aware branch loss function determined by calculating a triplet loss between the top key points and the corresponding lines and 2) a recursive pose refine branch loss function determined by calculating a residual between the top key points and the corresponding lines using a Levenberg-Marquardt algorithm. The pose aware branch loss function can determine a feature residual based on the determined high-definition estimated three degree-of-freedom pose of the ground view camera and a ground truth three degree-of-freedom pose.

The instructions can further include instructions to determine the one or more ground feature maps and one or more ground attention maps from one or more ground view images with one or more neural networks and determine the aerial feature map and an aerial attention map from an aerial view image with the one or more neural networks.

The instructions can include instructions to weight the feature maps with the attention maps. The instructions to determine the top key points can include instructions to determine the top key points from the one or more ground feature maps. The aerial view image can be a satellite image.

The instructions to determine the high-definition estimated three degree-of-freedom pose of the ground view camera can include instructions to determine the high-definition estimated three degree-of-freedom pose based on an initial estimate of the three degree-of-freedom pose of the ground view camera. The instructions can further include instructions to output the high-definition estimated three degree-of-freedom pose of the ground view camera to operate a vehicle. The system can include a vehicle computer configured to determine a vehicle path upon which to operate the vehicle based on the high-definition estimated three degree-of-freedom pose of the ground view camera and the aerial view image.

Disclosed herein is a method including determining top key points from one of an aerial feature map or one or more ground feature maps. The top key points are projected as corresponding lines on the other of the aerial feature map or the one or more ground feature maps. The method includes determining a depth estimate for the top key points on the corresponding lines and determining a high-definition estimated three degree-of-freedom pose of a ground view camera in global coordinates by iteratively determining geometric correspondence between the top key points and the corresponding lines until a global loss function is less than a user determined threshold.

The global loss function can be determined by summing 1) a pose aware branch loss function determined by calculating a triplet loss between the top key points and the corresponding lines and 2) a recursive pose refine branch loss function determined by calculating a residual between the top key points and the corresponding lines using a Levenberg-Marquardt algorithm. The pose aware branch loss function can determine a feature residual based on the determined high-definition estimated three degree-of-freedom pose of the ground view camera and a ground truth three degree-of-freedom pose.

The method can include determining the one or more ground feature maps and one or more ground attention maps from one or more ground view images with one or more neural networks and determining the aerial feature map and an aerial attention map from an aerial view image with the one or more neural networks.

The method can include weighting the feature maps with the attention maps. The top key points can be determined from the ground feature maps. The one or more neural networks can have a U-Net architecture.

The high-definition estimated three degree-of-freedom pose of the vehicle camera can be determined based on an initial estimate of the three degree-of-freedom pose of the ground view camera. The method can include outputting the high-definition estimated three degree-of-freedom pose of the ground view camera to operate a vehicle. The method can include determining a vehicle path upon which to operate the vehicle based on the high-definition estimated three degree-of-freedom pose of the ground view camera and the aerial view image.

FIG. 1 is a diagram of a sensing system 100. Sensing system 100 includes a vehicle 110, operable by a user and/or according to control by a computing device 115 which can include one or more vehicle electronic control units (ECUs) or computers, such as are known, possibly including additional hardware, software, and/or programming as described herein. The computing device 115 can receive data regarding the operation of the vehicle 110 from sensors 116. The computing device 115 may operate the vehicle 110 or components thereof instead of or in conjunction with control by a human user. The system 100 can further include a server computer 120 that can communicate with the vehicle 110 via a network 130.

The computing device 115 can include one or more processors and one or more memory devices such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing device, e.g., controllers, ECUs, or the like included in the vehicle 110 for monitoring and/or controlling various vehicle subsystems, e.g., a propulsion subsystem 112, a brake subsystem 113, a steering subsystem 114, etc. The computing device 115 is generally arranged for communications on a vehicle communication network, e.g., including a bus in the vehicle 110 such as a controller area network (CAN) or the like; the vehicle network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2X) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, e.g., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, e.g., according to including cellular communications (C-V2X) wireless communications cellular, Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2X) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc. Using data received in the computing device 115, e.g., the sensor data from the sensors 116, the server computer 120, etc., the computing device 115 may make various determinations and/or control various vehicle 110 components and/or operations. For example, the computing device 115 may include programming to regulate or control vehicle 110 operational behaviors (e.g., physical manifestations of vehicle 110 operation) such as speed, acceleration, deceleration, steering, etc., as well as tactical behaviors (e.g., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Each of the subsystems 112, 113, 114 may include respective processors and memories and/or one or more actuators. The subsystems 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices such as are known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110.

The vehicle 110 is generally a land-based vehicle 110 having three or more wheels, e.g., a passenger car, light truck, etc. The vehicle 110 includes one or more sensors 116, the V2X interface 111, the computing device 115 and one or more subsystems 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle data related to operations of the vehicle 110 such as velocity, yaw rate, steering angle, engine speed, brake pressure, oil pressure, the power level applied to subsystems 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2X interface 111 and computing device 115, and therefore these features will not be described further. A server computer 120 can be used to develop and train software that can be transmitted to a computing device 115 in a vehicle 110.

Figure 2:
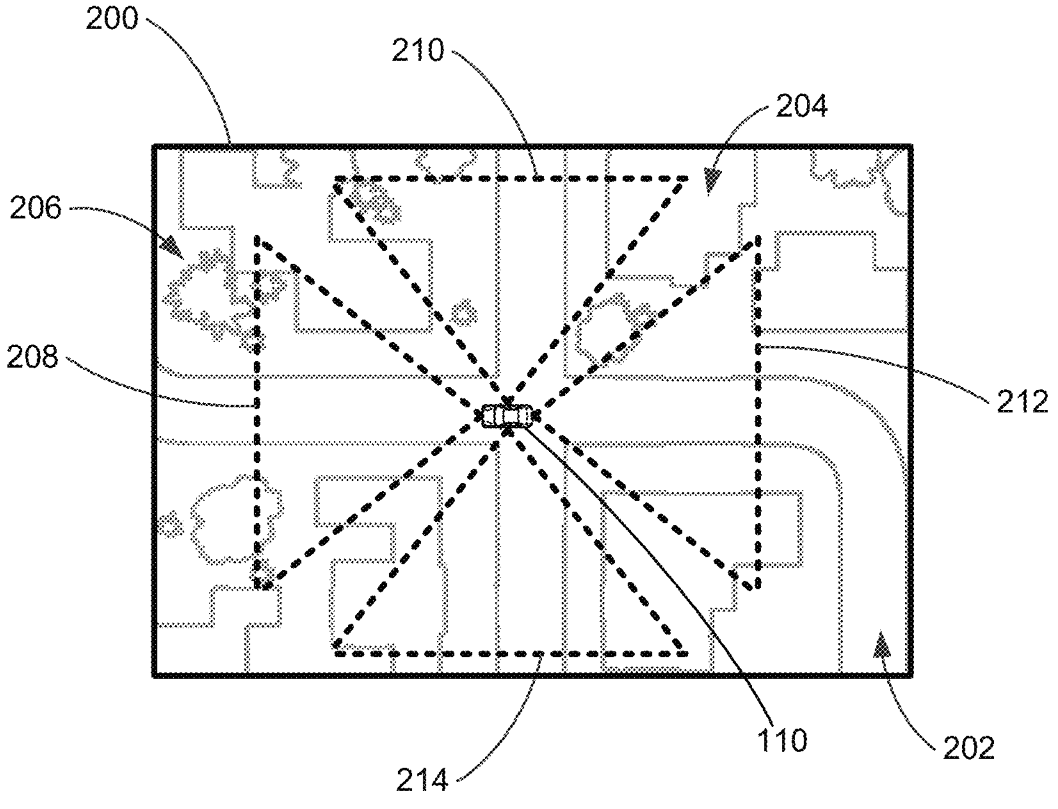
FIG. 2 is a diagram of an example satellite image including a vehicle.

FIG. 2 is a diagram of a satellite image 200. Satellite image 200 can be a map downloaded to a computing device 115 in a vehicle 110 via the network 130, e.g., from a source such as GOOGLE maps. Satellite image 200 includes roadways 202, buildings 204, indicated by rectilinear shapes, and foliage 206, indicated by irregular shapes. The version of satellite images 200 used herein is the version that includes photographic likenesses of objects such as roadways 202, buildings 204 and foliage 206. Included in satellite image 200 is a vehicle, such as vehicle 110. Vehicle 110 includes sensors 116, including video cameras. Included in satellite image 200 are four fields of view 208, 210, 212, 214 (e.g., spatial regions within which respective cameras can capture images) for four video cameras included at the front, right side, back, and left side of the vehicle 110, respectively.

Figure 3:
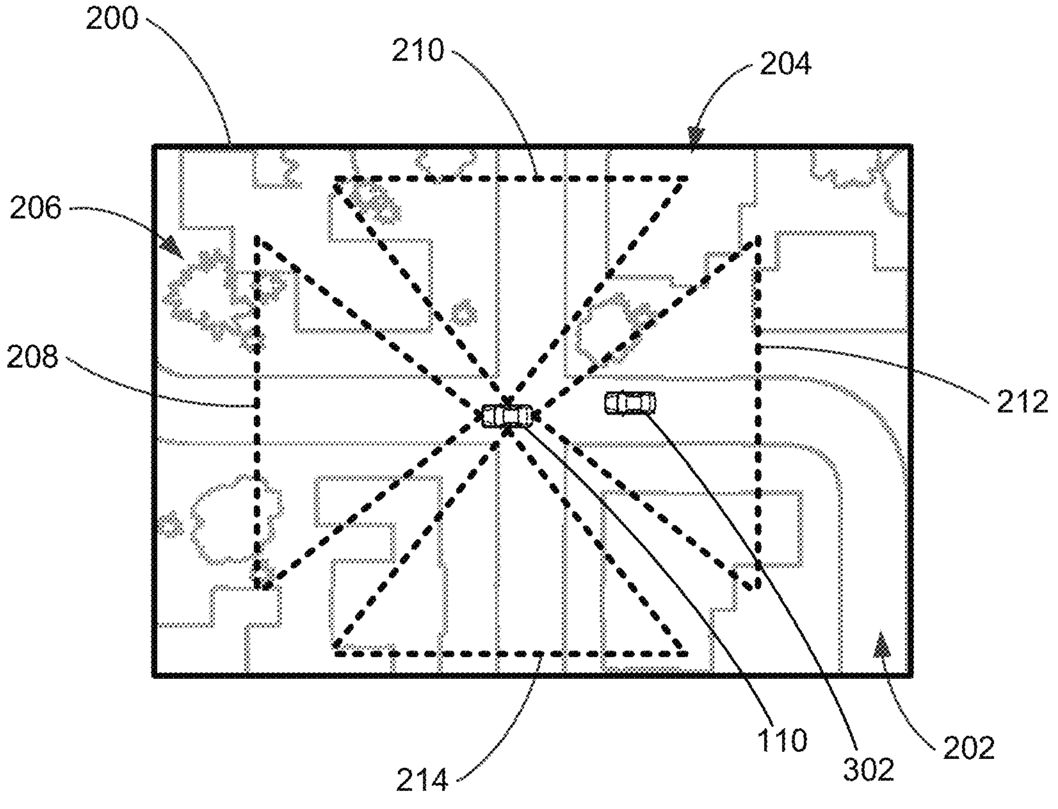
FIG. 3 is a diagram of another example satellite image including a vehicle.

FIG. 3 is a diagram of the satellite image 200 that includes an estimated three DoF pose 302 of vehicle 110. For example, an initial estimated three DoF pose 302 of vehicle 110 with respect to the satellite image 200 can be based on vehicle sensor data including a GPS sensor included in vehicle 110. Because of the limited resolution of GPS sensor and limited resolution of satellite images 200, the estimated three DoF pose 302 of vehicle 110 typically does not represent a sufficiently accurate pose of vehicle 110. Because of limited resolutions of GPS sensors and satellite images 200, an estimated three DoF pose 302 typically is not used to operate a vehicle 110.

One way to obtain high-definition data for operating vehicles 110 could be to produce HD maps for all areas upon which vehicle 110 operates. High-definition maps typically require extensive mapping efforts and large amounts of computer resources to produce and store the HD maps, along with large amounts of network bandwidth typically consumed to download the HD maps to vehicles 110, not to mention the large amount of computer memory typically required to store the maps in computing devices 115 included in vehicles. Satellite image guided geo-localization techniques described herein use 3D feature points determined based on video images acquired by video cameras included in a vehicle 110 to determine a high-definition estimated three DoF pose for a vehicle 110 based on satellite images without requiring large amounts of computer processing, networking, and/or memory resources typically required to produce, transmit, and store HD maps.

The key points detected by the disclosed systems and methods can circumvent use flat ground homography. Flat ground homography assumes that the world lies on a flat plane and maps all of the pixels from a given viewpoint onto this flat plane through homography projection. Thus, the techniques described herein remove the constraint of key points being confined to the ground plane. This enhancement enables the disclosed systems and methods to determine useful poses in a broader range of scenarios, typically leading to better performance.

Figure 4:
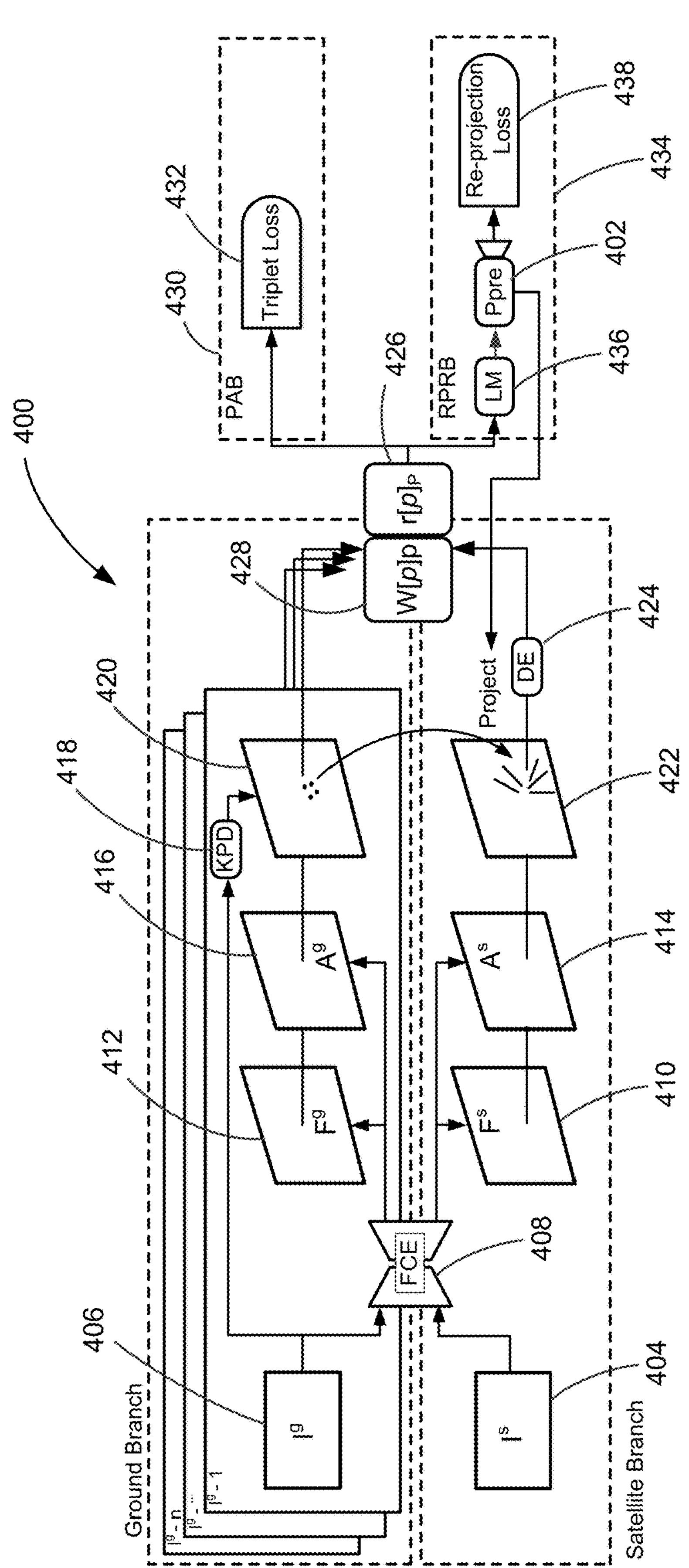
FIG. 4 is a diagram of an example system to determine a high-resolution three degree of freedom vehicle location in global coordinates.

FIG. 4 is a diagram of an example system 400 for determining a high-resolution estimated three DoF vehicle pose in global coordinates. The system 400 can be implemented with software instructions operating on a computing device 115 included in a vehicle 110, for example. The system 400 can be trained on the server computer 120 and downloaded or otherwise installed to the computing device 115 in the vehicle 110. Starting with a coarse pose, the system 400 can estimate an accurate three DoF pose 402 of a vehicle including lateral shift, longitudinal shift, and yaw angle in a satellite image 404 using ground-view images 406 that are taken in the same location. System 400 includes a feature and confidence map extractor (FCE) 408 having one or more convolutional neural networks (CNN) to extract a satellite feature map 410 and ground-view feature maps 412 from the satellite image 404 and the ground-view images 406, respectively. The CNN can be a U-Net structure to obtain feature maps with original resolution that benefits accurate pose estimation.

The CNNs used to extract the satellite feature map 410 and ground-view feature maps 412 can include convolutional layers followed by fully connected layers. Convolutional layers extract latent variables that indicate locations of feature points by convolving input images, such as images 404, 406 with a series of convolution kernels. Latent variables are input to fully connected layers that determine feature points by combining the latent variables using linear and non-linear functions. Convolution kernels and the linear and non-linear functions are programmed using weights determined by training the feature extractors.

Spatial attention maps (satellite attention map 414 and ground-view attention maps 416) are computed and used to weight the feature maps 410 and 412 to identify pixels with potential correspondence (i.e., co-visibility) between the two sets of images. The feature maps 410 and 412 are utilized to compute the point residual 426 using the equation $r[p]_P=F^s[p]_P-F^g[p]$. The spatial attention maps (satellite attention map 414 and ground-view attention maps 416) are generated and serve as point weights 428 using the equation $W[p]_P=A^s[p]_P*A^g[p]$. Here, 'P' represents vehicle pose and 'p' represents key points (top-K points) detected by a conventional key point detection (KPD) method 418. An attention map serves as a weight for pixel residuals. In the training process, attention towards moving and temporal objects decreases. Consequently, pixels with high values in the attention map indicate potential co-visibility between two views.

The KPD method 418 can be a conventional method, such as ORB (oriented FAST and rotated BRIEF) or SIFT (sorting intolerant from tolerant) and can be applied to identify the top key points, e.g., top-K points 420, from each query image to create a key points map 420. Top-K points refers to the top K number of highest scoring key points; their score provided by the KPD 418. A high score indicates more distinctive points, like corner points. ORB builds on the well-known FAST key point detector and the BRIEF detector.

The top-K points from each query confidence map are detected and then projected to the satellite map 410 as lines to create a projected map 422. Because the depth of the top-K points in the ground view images is unknown (see FIG. 5A), the projections on the satellite map are depicted as lines (see FIG. 5B) and are dependent on the vehicle pose. A point to line depth estimation (DE) module 424 uses a transformer attention mechanism to accurately estimate the respective depths of the top-K points. The depths are presented as distances from the camera along its z-axis (facing direction). Using this depth information, the system computes the coordinates of the key points in the satellite image. Subsequently, the residuals 426 and the point weights 428 are calculated from these sparse representations across the two views.

A global loss function is determined by summing a pose aware branch (PAB) loss function 430 and a recursive pose refine branch (RPRB) loss function 434. The PAB 430 employs a triplet loss 432 to differentiate the residual between two views conditioned on the correct (ground truth) and incorrect (initial) pose. A triplet loss is a function where a reference input (i.e., anchor) is compared to a matching input (i.e., positive) and a non-matching input (i.e., negative). A triplet loss function minimizes the distance from the anchor to the positive and maximizes the distance from the anchor to the negative. The PAB 430 can be determined by calculating the triplet loss between the top-K points and the corresponding lines. The PAB 430 is only enabled when the initial pose (incorrect pose) is far from the ground truth pose. The RPRB 434 is deployed to iteratively optimize the initial pose towards the ground truth pose with the Levenberg-Marquardt (LM) algorithm 436. The RPRB can be determined by calculating a residual between the top key points and the corresponding lines using the LM algorithm 436. In addition to the triplet loss 432, the re-projection error 438 is also minimized when optimizing the vehicle pose. It is noted that both PAB 430 and RPRB 434 objective branches supervise feature extraction, but they have different focus. PAB 430 encourages the correct pose estimation as well as penalizes for the incorrect estimation. RPRB 434 encourages the most correct predicted pose to be close to the ground truth.

The two values respectively output from the PAB 430 and the RPRB 434 are added to form the global loss function and compared to a predetermined threshold to determine whether the system has converged to a solution. If the global loss function is greater than the threshold, the process loops back to reduce the loss function on the next iteration. When the global loss function is less than the threshold, the system has converged on a high-definition estimated three DoF pose 402.

Figure 5A:
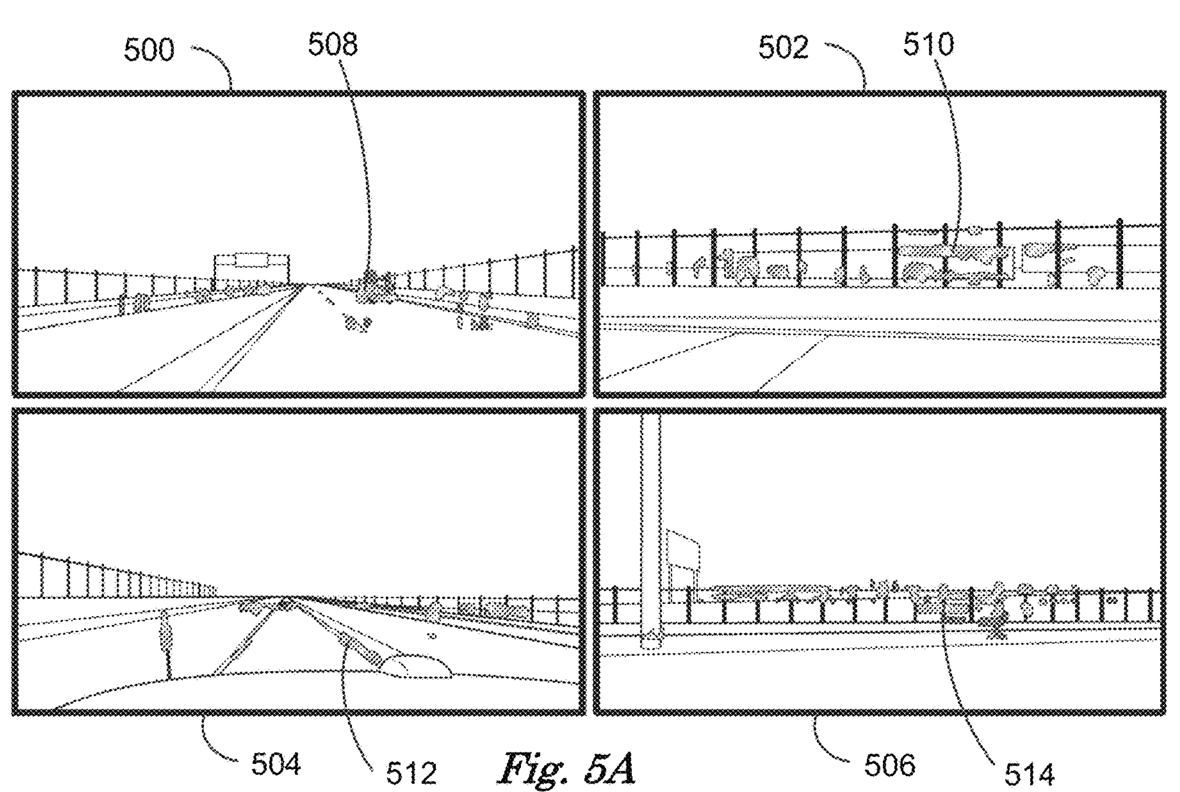
FIG. 5A is a diagram of example images of a traffic scene including features.

FIG. 5A is a diagram of four images 500, 502, 504, 506 acquired by video cameras included in vehicle 110 corresponding to different fields of view, similar to fields of view

208, 210, 212, 214, respectively. Images 500, 502, 504, 506 can be red, green, and blue (RGB) color images acquired at standard video resolution, approximately 2K by 1K pixels, for example. Images 500, 502, 504, 506 have been processed to determine top-K features, e.g., point groups 508, 510, 512, 514, respectively. Images 500, 502, 504, 506 that include feature points 508, 510, 512, 514 are referred to as key points maps. Key feature points 508, 510, 512, 514 are indicated by hatched regions in the images 500, 502, 504, 506.

Figure 5B:
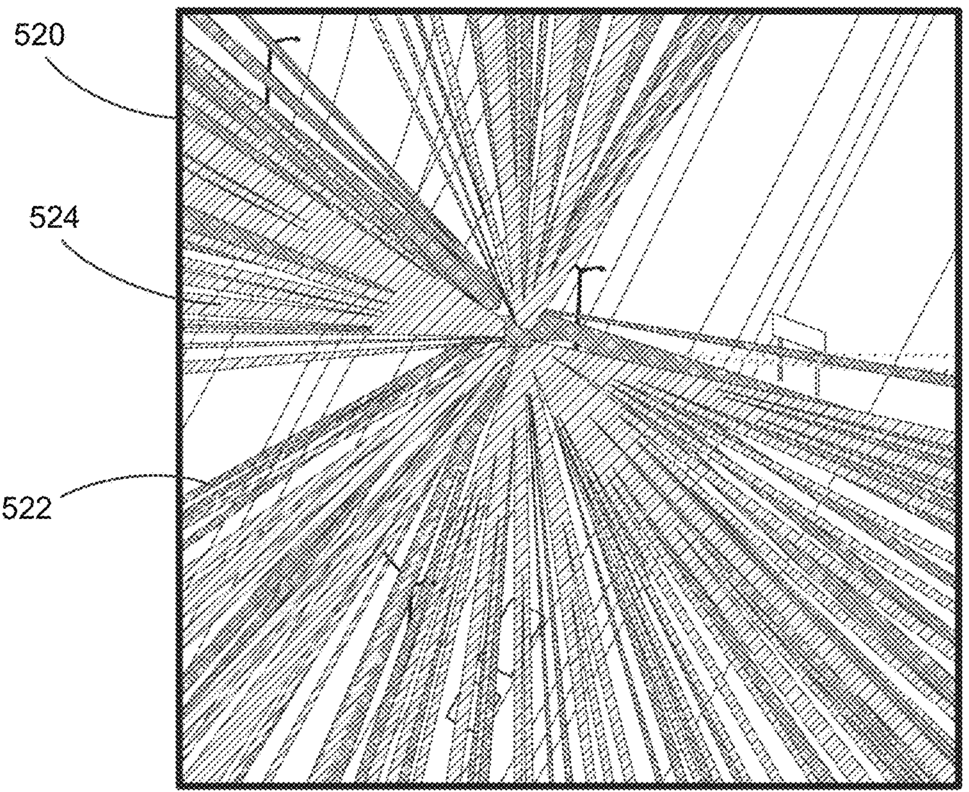
FIG. 5B is a diagram of an example satellite image including line features.

FIG. 5B is a diagram of a satellite image 520 including line features corresponding to images 500, 502, 504, 506. The key feature points 508, 510, 512, 514 are projected as lines (i.e., line groups 522, 524) onto the satellite reference image 520 using the initial pose (depicted as cross-hatched areas 522) and the ground truth pose (depicted in hatched areas 524). The projections 522 and 524 on the satellite image 520 are lines due to the unknown depth of the key points in the ground view images 500, 502, 504, 506. In other words, it is unknown how far away the key points are from the ground view camera in the ground view images. The projections 522 and 524 are lines extending horizontally from the camera location.

Figure 6A:
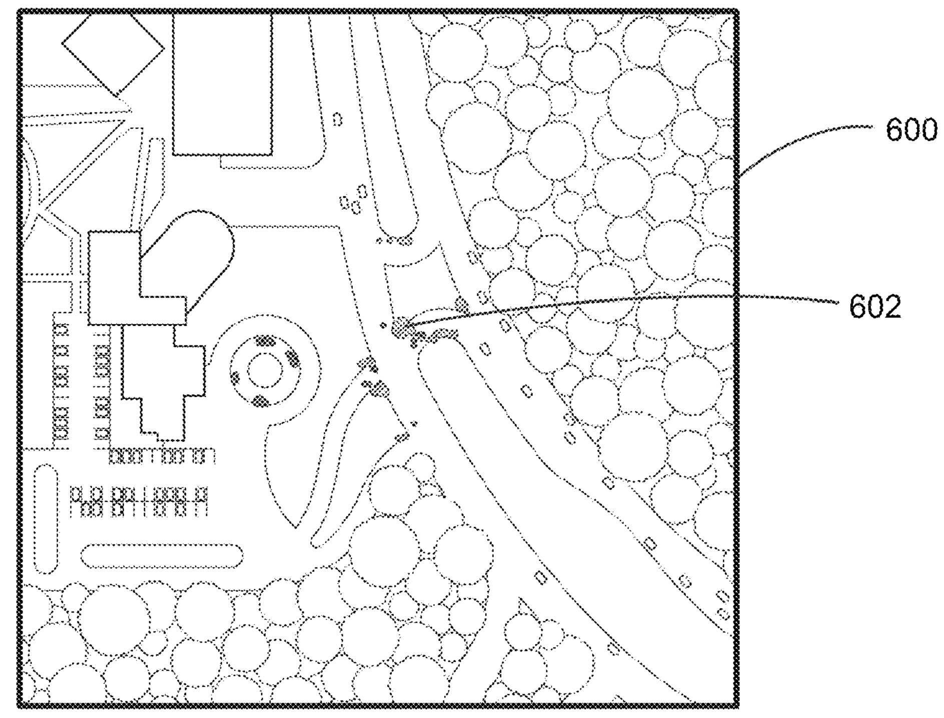
FIG. 6A is a diagram of an example satellite image including features.
Figure 6B:
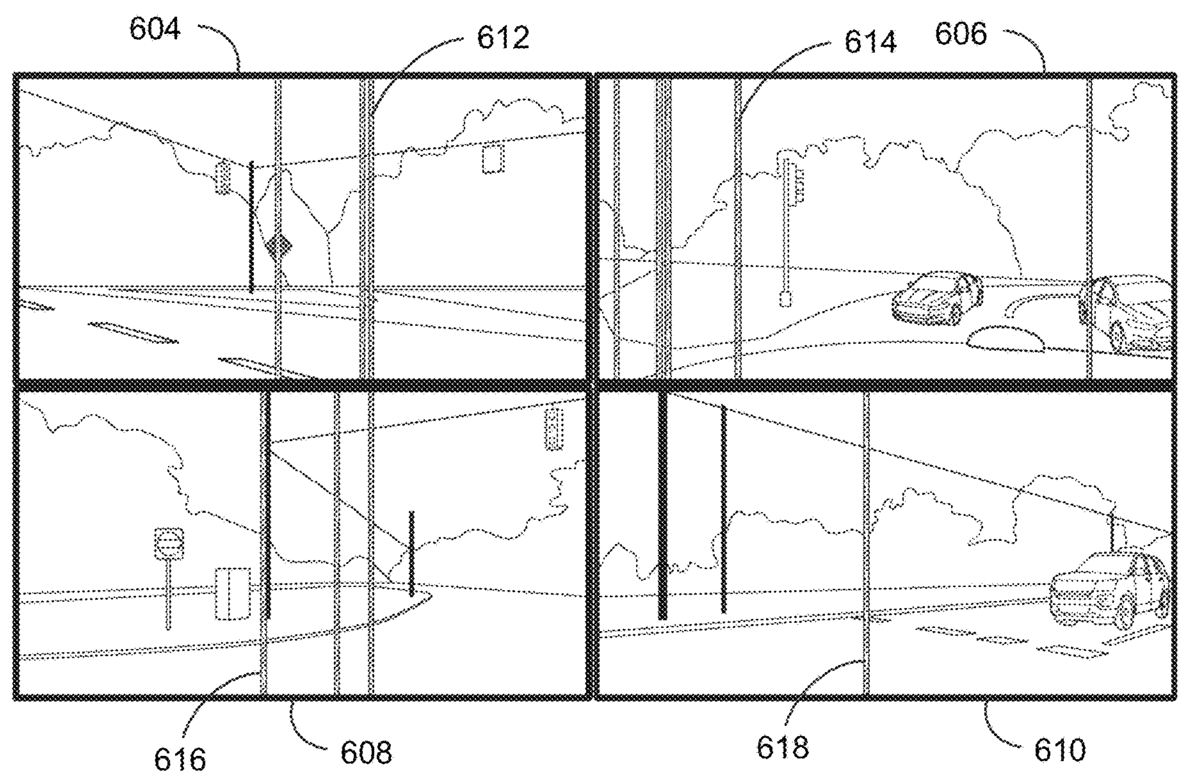
FIG. 6B is a diagram of example images of a traffic scene including line features.

Although techniques are shown and described herein with respect to detecting and projecting key points in the ground views as lines on a satellite view as shown in FIGS. 5A and 5B, key points in the satellite view could be detected and projected as lines on the ground view images as shown in FIGS. 6A and 6B. FIG. 6A is a diagram of a satellite image 600 corresponding to ground view images 604, 606, 608, 610 (FIG. 6B). Satellite image 600 has been processed to determine top-K features, e.g., point groups 602. With reference to FIG. 6B, the projections of the key points 602 can be visualized as lines on the ground view images 604, 606, 608, 610. These lines are depicted as vertical hatched line groups 612, 614, 616, 618. The projections 612, 614, 616, 618 on the ground view images 604, 606, 608, 610 are lines due to the unknown depth (i.e., altitude) of the key points in the satellite image 600. The ground view images 604, 606, 608, 610 can be acquired by video cameras included in vehicle 110 corresponding to different fields of view, similar to fields of view 208, 210, 212, 214, respectively.

Figure 7:
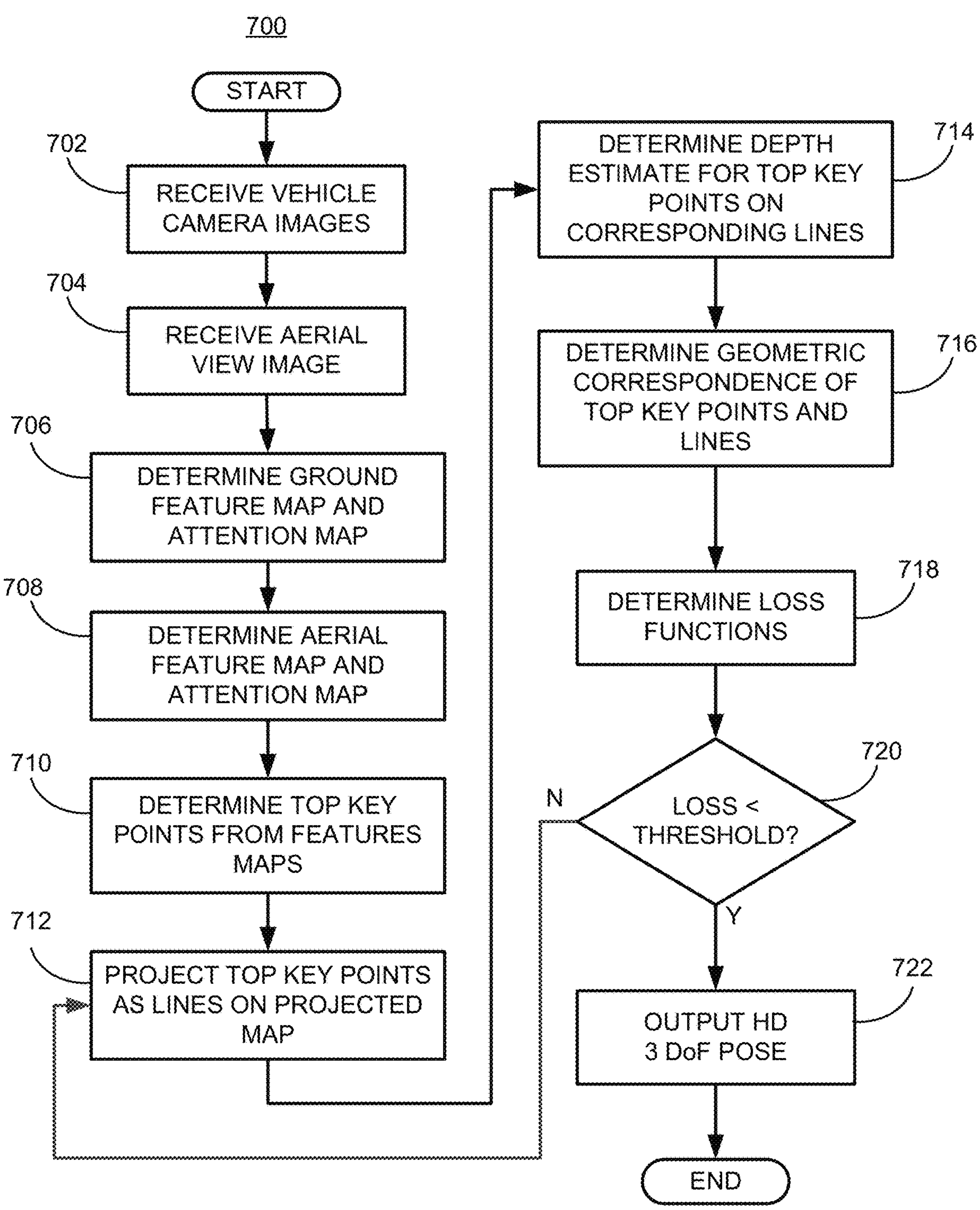
FIG. 7 is a flowchart diagram of an example process to determine a high-resolution three degree of freedom vehicle location in global coordinates.

FIG. 7 is a flowchart, described in relation to FIGS. 1-6, of a process 700 for determining a high-definition estimated three DoF pose based on satellite image guided geo-localization. Process 700 can be implemented in a computing device 115 included in a vehicle 110. Process 700 includes multiple blocks that can be executed in the illustrated order. Process 700 could alternatively or additionally include fewer blocks or can include the blocks executed in different orders.

Process 700 begins at block 702 where a computing device 115 in a vehicle 110 receives images 406 from e.g., one or more video cameras included in the vehicle 110. The one or more images 406 include image data regarding an environment around the vehicle 110 and can include any portion of the environment around the vehicle including overlapping fields of view 208, 210, 212, 214, for example.

At block 704 computing device 115 receives an aerial view image (e.g., a satellite image 404). The satellite image 404 can be acquired by downloading the satellite image 404 from the Internet via network 130, for example. The satellite image 404 can also be retrieved from memory included in computing device 115. Satellite images 404 include location data in global coordinates that can be used to determine the location in global coordinates of any point in the satellite image 404. Satellite image 404 can be selected to include an estimated three DoF pose 302. The estimated three DoF pose 302 can be determined by acquiring data from vehicle sensors 116, for example GPS.

At block 706 computing device 115 inputs the received ground view images 406, to one or more trained neural networks, e.g., FCE 408. The one or more neural networks can be trained on a server computer 120 and the downloaded or otherwise installed to a computing device 115 in a vehicle 110. The one or more neural networks determines the ground features map 412 and the ground attention map 416 corresponding to the received ground view images 406.

At block 708 computing device 115 also inputs the received aerial view image, e.g., satellite image 404 to the one or more neural networks, e.g., FCE 408. The one or more neural networks determine the aerial features map 410 and the aerial attention map 414 corresponding to the received aerial view image 404.

At block 710 computing device 115 determines top-K feature points. The attention maps (satellite attention map 414 and ground-view attention maps 416) are used to weight the feature maps 410 and 412 to identify pixels with potential correspondences between the two sets of images. A KPD method 418 can be applied to identify the top-K points 420 from each query image to create a key points map 420.

At block 712 computing device 115 projects the top-K points, e.g., key points map 420, onto the satellite map 410 as lines to create a projected map 422. Because the depth of the top-K points in the ground view images is unknown (see FIG. 5A), the projections on the satellite map are depicted as lines (see FIG. 5B) and are dependent on the vehicle pose. The initial iteration of block 712 can use the estimated three DoF pose 302 from vehicle sensor 116 data. Subsequent iterations of process 700 enhance the estimated three DoF pose 302 by reducing the global loss function as described above.

At block 714 computing device 115 estimates the respective depths of the top-K points using a point to line DE module 424. The point to line DE module 424 can use a transformer attention mechanism to accurately estimate the respective depths. The depths are presented as distances from the camera along the projected lines (e.g., z-axis facing direction).

At block 716 computing device 115 determines a high-definition estimated three degree-of-freedom pose 402 of a ground view camera (e.g., camera on vehicle 110) in global coordinates by iteratively determining geometric correspondence between the top key points and the corresponding lines and/or depths until the global loss function is less than a user determined threshold. Geometric correspondence is the process by which the data points in the projected map 422 and the satellite map 410 are paired and the entire projected map 422 is iteratively reprojected to minimize the pairwise error or difference in location of each pair of data points.

At block 718 computing device 115 determines the PAB loss function 430 and the RPRB loss function 434. The two values respectively output from these functions are added to form a global loss function and compared to the predetermined threshold, at block 720, to determine whether process 700 has converged to a solution. If the global loss function is greater than the threshold, process 700 loops back to block 712 to reduce the loss function on the next iteration. The key points map 420 is reprojected using the new estimated three DoF pose to form a new projected map 422 and the new geometric correspondence between the new projected map 422 and the satellite map 410 to determine a new global loss function. When the global loss function is less than the threshold, process 700 stops iterating and the current estimated three DoF pose is output as the high-definition estimated three DoF pose 402 at block 722.

At block 722 computing device 115 outputs the high-definition estimated three DoF pose 402 from block 718 to be used to operate vehicle 110 as described in relation to FIG. 8, below. The high-definition estimated three DoF pose 402 can be described by x and y position coordinates and a yaw rotational coordinate to provide a three DoF pose that defines the vehicle location and orientation. Following block 722 process 700 ends.

Figure 8:
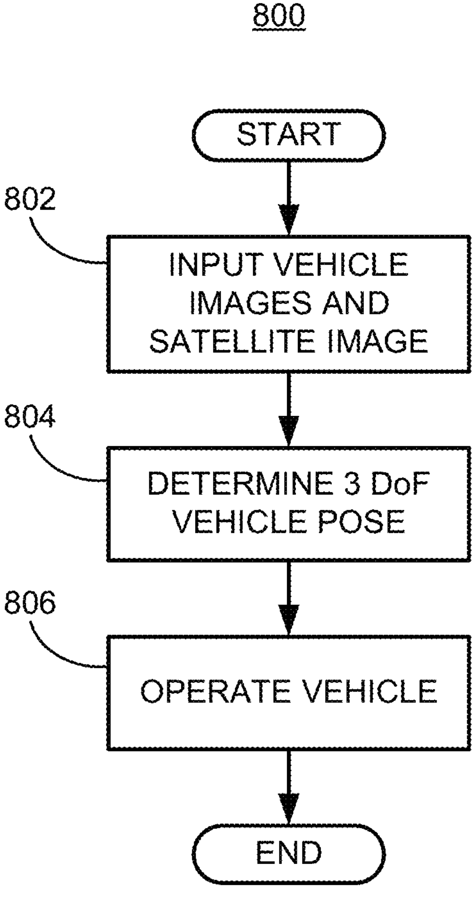
FIG. 8 is a flowchart diagram of an example process to operate a vehicle based on a high-resolution vehicle location in global coordinates.

FIG. 8 is a flowchart, described in relation to FIGS. 1-7 of a process 800 for operating a vehicle 110 based on a high-definition estimated three DoF pose determined based on the satellite image guided geo-localization system 400. Process 800 can be implemented by computing device 115 included in a vehicle 110. Process 800 includes multiple blocks that can be executed in the illustrated order. Process 800 could alternatively or additionally include fewer blocks or can include the blocks executed in different orders.

Process 800 begins at block 802, where the computing device 115 in the vehicle 110 acquires one or more images, such as images 500, 502, 504, 506, from one or more video cameras included in the vehicle 110 and acquires a satellite image, such as satellite image 520, by downloading via the network 130 or retrieving from memory included in computing device 115. An estimated three DoF pose 302 for vehicle 110 is determined based on data acquired by vehicle sensors 116.

At block 804 computing device 115 enhances the estimated three DoF pose 302 to a high-definition estimated three DoF pose 402 by processing the one or more images 500, 502, 504, 506 and the satellite image 520 with a satellite image guided geo-localization system 400 as described in relation to FIG. 4.

At block 806 computing device 115 uses the high-definition estimated three DoF pose 402 to determine a vehicle path for the vehicle 110. A vehicle can operate on a roadway based on a vehicle path by determining commands to direct the vehicle's propulsion (e.g., powertrain), braking, and steering components to operate the vehicle so as to travel along the path. A vehicle path is typically a polynomial function upon which a vehicle, such as vehicle 110, can be operated. Sometimes referred to as a path polynomial, the polynomial function can specify a vehicle location (e.g., according to x, y, and z coordinates) and/or pose (e.g., roll, pitch, and yaw), over time. That is, the path polynomial can be a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example. Further for example, the path polynomial p (x) is a model that predicts the path as a line traced by a polynomial equation. The path polynomial p (x) predicts the path for a predetermined upcoming distance x, by determining a lateral coordinate p, e.g., measured in meters:

$$p(x) = a_0 + a_1 x + a_2 x^2 + a_3 x^3 \tag{1}$$

where $a_0$ an offset, e.g., a lateral distance between the path and a center line of the vehicle 110 at the upcoming distance x, $a_1$ is a heading angle of the path, $a_2$ is the curvature of the path, and $a_3$ is the curvature rate of the path.

The polynomial function can be used to direct the vehicle 110 from a current location indicated by the high-definition estimated three DoF pose to another location in an environment around the vehicle while maintaining minimum and maximum limits on lateral and longitudinal accelerations. The vehicle 110 can be operated along a vehicle path by transmitting commands to subsystems 112, 113, 114 to control vehicle propulsion, steering and brakes. Following block 806 process 800 ends.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random-access memory, etc.

A computer-readable medium (also referred to as a processor-readable medium) includes any non-transitory (i.e., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claimed invention. Any use of "based on" and "in response to" herein, including with reference to media, processes, systems, methods, etc. described herein, indicates a causal relationship, not merely a temporal relationship.

The invention claimed is:

1. A system, comprising:

a computer that includes a processor and a memory, the memory including instructions executable by the processor to:

determine top key points from one of an aerial feature map or one or more ground feature maps;

project the top key points as corresponding horizontal lines on the other of the aerial feature map and vertical lines on the one or more ground feature maps;

determine a depth estimate for the top key points on the corresponding lines; and determine a high-definition estimated three degree-of-freedom pose of a ground view camera in global coordinates by iteratively determining geometric correspondence between the top key points and the corresponding lines until a global loss function is less than a user determined threshold.

2. The system of claim 1, wherein the global loss function is determined by summing 1) a pose aware branch loss function determined by calculating a triplet loss between the top key points and the corresponding lines and 2) a recursive pose refine branch loss function determined by calculating a residual between the top key points and the corresponding lines using a Levenberg-Marquardt algorithm.

3. The system of claim 2, wherein the pose aware branch loss function determines a feature residual based on the determined high-definition estimated three degree-of-freedom pose of the ground view camera and a ground truth three degree-of-freedom pose.

4. The system of claim 1, wherein the instructions further comprise instructions to determine the one or more ground feature maps and one or more ground attention maps from one or more ground view images with one or more neural networks and determine the aerial feature map and an aerial attention map from an aerial view image with the one or more neural networks.

5. The system of claim 4, wherein the instructions further comprise instructions to weight the feature maps with the attention maps.

6. The system of claim 1, wherein the instructions to determine the top key points include instructions to determine the top key points from the one or more ground feature maps.

7. The system of claim 1, wherein the instructions to determine the high-definition estimated three degree-of-freedom pose of the ground view camera include instructions to determine the high-definition estimated three degree-of-freedom pose based on an initial estimate of the three degree-of-freedom pose of the ground view camera.

8. The system of claim 1, wherein the aerial view image is a satellite image.

9. The system of claim 1, wherein the instructions further comprise instructions to output the high-definition estimated three degree-of-freedom pose of the ground view camera to operate a vehicle.

10. The system of claim 9, further comprising a vehicle computer configured to determine a vehicle path upon which to operate the vehicle based on the high-definition estimated three degree-of-freedom pose of the ground view camera and the aerial view image.

11. A method, comprising:

determining top key points from one of an aerial feature map or one or more ground feature maps;

projecting the top key points as corresponding horizontal lines on the other of the aerial feature map and vertical lines on the one or more ground feature maps;

determining a depth estimate for the top key points on the corresponding lines; and determining a high-definition estimated three degree-of-freedom pose of a ground view camera in global coordinates by iteratively determining geometric correspondence between the top key points and the corresponding lines until a global loss function is less than a user determined threshold.

12. The method of claim 11, wherein the global loss function is determined by summing 1) a pose aware branch loss function determined by calculating a triplet loss between the top key points and the corresponding lines and 2) a recursive pose refine branch loss function determined by calculating a residual between the top key points and the corresponding lines using a Levenberg-Marquardt algorithm.

13. The method of claim 12, wherein the pose aware branch loss function determines a feature residual based on the determined high-definition estimated three degree-of-freedom pose of the ground view camera and a ground truth three degree-of-freedom pose.

14. The method of claim 11, further comprising determining the one or more ground feature maps and one or more ground attention maps from one or more ground view images with one or more neural networks and determining the aerial feature map and an aerial attention map from an aerial view image with the one or more neural networks.

15. The method of claim 14, further comprising weighting the feature maps with the attention maps.

16. The method of claim 11, wherein the top key points are determined from the ground feature maps.

17. The method of claim 11, wherein the determined high-definition estimated three degree-of-freedom pose of the vehicle camera is determined based on an initial estimate of the three degree-of-freedom pose of the ground view camera.

18. The method of claim 11, wherein the one or more neural networks have a U-Net architecture.

19. The method of claim 11, further comprising outputting the high-definition estimated three degree-of-freedom pose of the ground view camera to operate a vehicle.

20. The method of claim 19, further comprising determining a vehicle path upon which to operate the vehicle based on the high-definition estimated three degree-of-freedom pose of the ground view camera and the aerial view image.

* * * * *